May 28, 1940.　　　J. GIBBONS　　　2,202,050
CUSHIONED BUMPER
Filed May 2, 1939
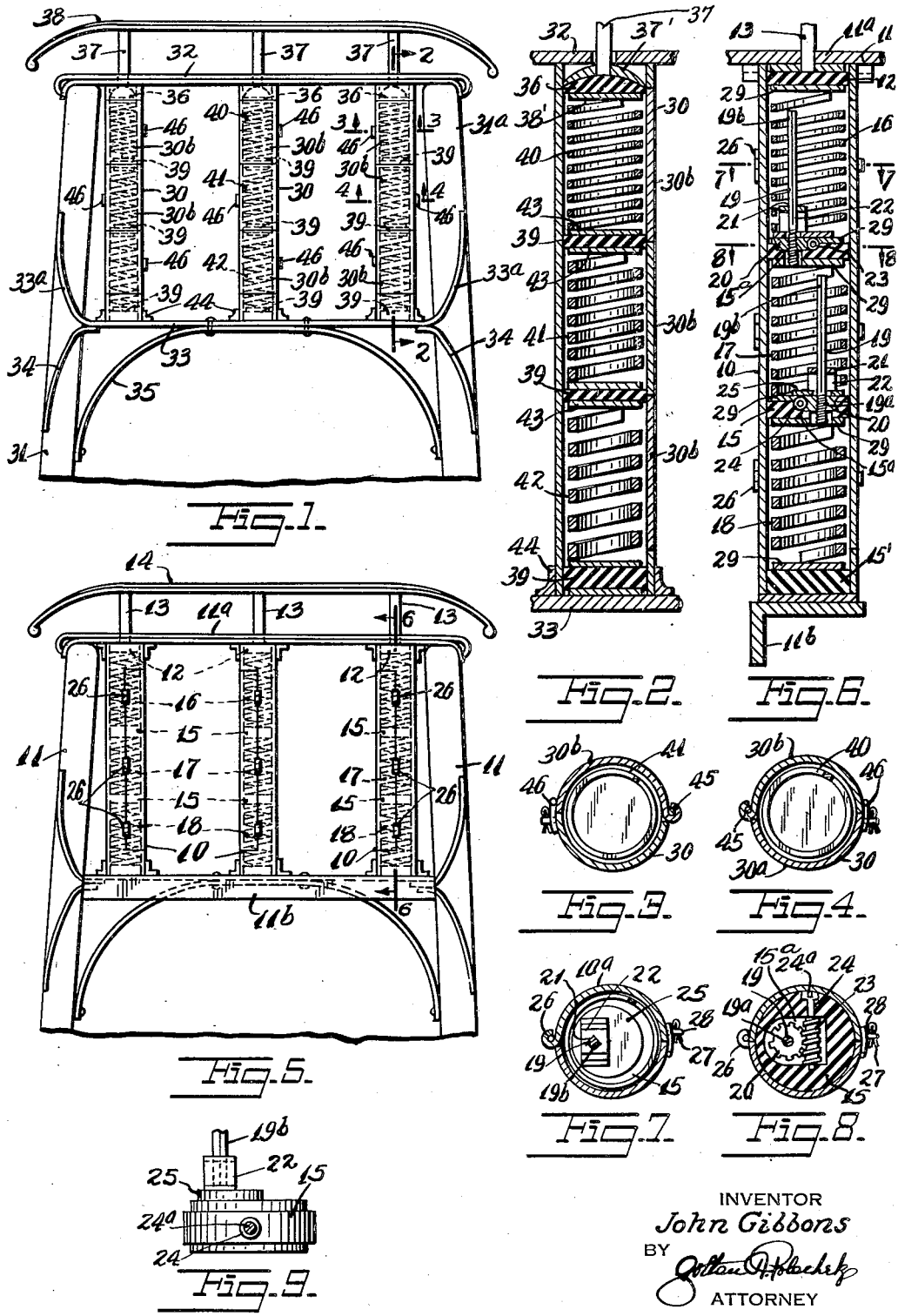
INVENTOR
John Gibbons
BY
ATTORNEY Patented May 28, 1940

2,202,050

UNITED STATES PATENT OFFICE 2,202,050

CUSHIONED BUMPER

John Gibbons, Brooklyn, N. Y.

Application May 2, 1939, Serial No. 271,275

10 Claims. (Cl. 293—55)

This invention relates to new and useful improvements in a cushion bumper.

More specifically, the invention proposes the construction of a cushion bumper characterized by a plurality of parallel cylinders each having a number of pistons slidably mounted therein with the outermost pistons having piston rods for supporting a bumper in a manner to permit the bumper to move towards the chassis of a vehicle upon which the device is supported.

Still further, it is proposed to arrange springs of various stiffness between the faces of the pistons permitting the springs to act as cushions for the bumper when the vehicle strikes an object.

Furthermore, the invention proposes various arrangements for securing and holding the parts of the cushioned bumper on the chassis of a motor vehicle or other vehicle.

Still further, it is proposed to provide rods on certain pistons which extend towards the outer ends of the cylinders in a manner to control the distance through which the pistons will move with relation to each other.

Still further, the invention proposes a means for adjustably supporting the rods upon the pistons in a manner to permit them to be moved forwards or rearwards thereon in varying the said relative distance.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of a cushion bumper constructed according to this invention and applied to the front end of the chassis of a vehicle.

Fig. 2 is an enlarged sectional view on the line 2—2 of Fig. 1.

Fig. 3 is a sectional view on the line 3—3 of Fig. 1.

Fig. 4 is a sectional view on the line 4—4 of Fig. 1.

Fig. 5 is a fragmentary plan view of a cushioned bumper constructed according to a modified form of this invention, applied to the front end of the chassis of a vehicle.

Fig. 6 is a fragmentary enlarged sectional view taken on the line 6—6 of Fig. 5.

Fig. 7 is a sectional view taken on the line 7—7 of Fig. 6.

Fig. 8 is a sectional view taken on the line 8—8 of Fig. 6.

Fig. 9 is a fragmentary side elevational view of one of the pistons shown in Fig. 6.

The cushioned bumper, according to this invention, includes a plurality of parallel cylinders 30 longitudinally mounted on the front end of a chassis 31 of an automobile or other vehicle. These cylinders are mounted between the longitudinal side members 31ª of the chassis. Across the front ends of these side longitudinal members 31ª there is a bracket 32. This bracket is fixedly mounted upon the chassis. Across the rear ends of the cylinders 30 there is a brace bar 33. This brace bar extends between the longitudinal members 31ª and has end portions 33ª engaging over the side members 31ª. Braces 34 and 35 are mounted on the side members 31ª and reinforce the bar 33 and assist in fixedly holding the bar in position.

A resilient piston 36 is slidably mounted in the front end of each of the cylinders 30. Piston rods 37 are connected with these pistons 36 and extend through openings in the bracket 32 and at their outer ends support a bumper 38. Each resilient piston 36 has disc members 37' and 38' mounted upon the faces thereof. Auxiliary resilient pistons 39 are slidably mounted within each cylinder 30 and are spaced from each other. Springs 40, 41 and 42 preferably of square cross section are engaged between the pistons. The springs 40 are designed to be the weakest of the groups and are engaged between the two outermost pistons. The springs 41 are designed of intermediate strength and are disposed between the intermediate pistons 39. The springs 42 are the stiffest of the groups and are housed within the inner end of the cylinders.

Each piston 39 has a facing 43 of metal. The springs engage these facings to prevent rubbing of the parts, rattling or contacting. At their inner ends, the cylinders 30 are also supported by flanges 44 which are mounted on the bar 33.

Each cylinder 30 includes a stationary half section 30ª and several hingedly mounted sections 30ᵇ comprising doors. These doors 30ᵇ extend along the entire length of each cylinder. Each door 30ᵇ is hingedly mounted at one side by a hinge construction 45. At the other side each door 30ᵇ is releasably held by a latch 46. This latch may be opened and then the door 30ᵇ may be opened. This gives access to the interior of the cylinder. It is through the open sides of the cylinders 30 that the pistons and the springs may be engaged therein.

The operation of the device is as follows:

When the bumper 38 strikes an object it will be pressed in, compressing the springs 40, 41 and 42. These springs may be so designed that, initially, the spring 40 is compressed before the springs 41 and 42 are materially affected. Thus the initial resistance to inward motion of the bumper 38 is relatively weak. However, if the force continues the spring 41 starts to be materially compressed, and finally the spring 42. These springs may be designed so that the coils thereof contact each other at the point where it is desired that the motion be transmitted to others of the springs within the cylinders. The pistons 39 float within the cylinders and assume positions depending upon the conditions of compression of the springs.

The cushion bumper, according to the form of the invention shown in Figs. 5 to 9, includes a plurality of parallel cylinders 10 longitudinally mounted on the front end of the chassis 11. Each of the cylinders 10 has its front end supported upon a bracket 11ª extending across the front end of the chassis 11. Each of the cylinders 10 has its rear end supported upon a bar 11ᵇ extending between the sides of the chassis 11.

A piston 12 is slidably mounted in the outer end of each cylinder 10. Each of the pistons 12 is provided with a piston rod 13, each extends through an opening formed in the bracket 11ª of the chassis 11. A bumper 14 of conventional construction is supported upon the extended ends of the rods 13 which are supported upon the pistons 12. This construction permits the bumper 14 to move towards the chassis 11 in the event the vehicle should strike an immovable object.

Each of the cylinders 10 has additional pistons 15, slidably mounted therein to the rear of the piston 12. The pistons 12 and 15 are spaced from each other as shown in Fig. 6. Resilient members are arranged between all of the pistons. The resilient members comprise springs. In each cylinder a spring 16 is arranged between the adjacent faces of the piston 12 and its next adjacent piston 15. A second spring 17 having a greater stiffness than the spring 16 is arranged between the adjacent faces of the next pistons 15. A third spring 18 is arranged between the adjacent faces of the innermost piston 15 and a wall member 15'. This spring 18 has a stiffness greater than both the springs 16 and 17. These springs are preferably of square cross section.

Rods 19 are mounted upon the pistons 15 and extend towards the outer end of the cylinders 10 for limiting the distances through which the pistons may move together relative to each other, but not relative to the back wall of the cylinders 10. That is, the piston 12 may move through a limited distance compressing the spring 16 until it strikes the rod 19 on the outermost piston 15. This piston 12 may not move any further relative to the piston 15. However, both of these pistons may move relative to the back wall of the cylinder 10 to compress the spring 17. In the same manner, when one of the pistons 15 engages the rod 19 mounted on the innermost piston 15, all three of the pistons will move relative to the back wall of the cylinder 10 to compress the spring 18. When the pressure on the bumper is relieved, the springs 16, 17, and 18 will return all of the pistons to their normal positions.

A means is provided for adjusting the rods forwards or rearwards for varying said distances. Each of the rods 19 is provided with a threaded portion 19ª which threadedly engages through a bushing 20 rotatively supported in a cutout 15ª formed in each of the additional pistons. The extended end of each of the rods 19 is squared as shown at 19ᵇ and passes through a square opening 21 formed in a bracket 22 mounted on the face of the piston 15. This squared opening through which the square portion of the rod 19 passes prevents the rod from rotating while the rod is being adjusted.

The periphery of the bushing 20 is provided with gear teeth which mesh with the teeth of a worm gear 23 mounted upon a shaft 24 rotatively extended through the cutout 15ª at right angles to the threaded portion 19ª of the rod 19. One end 24ª of the shaft 24 is extended to the periphery of the piston 15 and is provided with an inwardly extending groove into which the end of a screw driver is adapted to be engaged in permitting the shaft to be rotated to similarly rotate the worm gear 23. These rotations of the worm gear will be transmitted to the bushing and cause the same to rotate, and extend and retract the rod 19 depending upon the direction the shaft 24 is being turned.

Since the rod 19 is being held against rotating by means of the square portion which engages the square opening, this rod necessarily must be extended and retracted when the shaft 24 is turned. Each of the pistons 15 is provided with a plate 25 mounted upon the face thereof and extending over the cutout 15ª for holding the bushing 20 and the worm gear 23 in position therein.

As shown in Fig. 6, it will be noted that the rods 19 are staggered with relation to each other to prevent the rear end of the frontmost rod from striking the front end of the rearmost rod in the event a portion of the back end of the frontmost rod should be extended beyond the back face of the piston upon which it is mounted.

Each of the cylinders 10 has a portion of one of its sides separated from the cylinder forming a door 10ª which is pivotally supported by means of a plurality of hinges 26. These hinges 26 permit the door 10ª to be opened so that a screw driver may be engaged into the groove formed in the shaft 24 for rotating the same. The doors are adapted to be held in a closed position by means of a plurality of cotter pins 27 which extend through the aligned openings formed in a plurality of outwardly extending lugs formed on the free edge of the door of the adjacent edge cylinder proper.

The faces of the pistons 12 and 15 and the member 15' are provided with a facing of sheet metal 29 for preventing the ends of the springs from coming in direct contact with the pistons which are formed of rubber. The pistons are formed of rubber but not for the express purpose of sealing the spaces between the pistons, but rather for silencing the operation thereof. As a matter of fact, it is desired that the air in the chambers between the pistons readily escape from the cylinders when the pistons are moving towards each other so as not to retard this action.

It is to be understood that any number of spring units may be used in connection with my device and that the chambers containing the spring may be either straight or curved as desired.

While I have illustrated and described the preferred embodiments of my invention, it is to be understood that I do not limit myself to the precise constructions herein disclosed and the right is reserved to all changes and modifications com-

Having thus described my invention, what I claim as new, and desire to secure by United States Letters Patent is:

1. A cushioned bumper, comprising a plurality of parallel cylinders for attachment longitudinally on the chassis of a vehicle, a piston slidably mounted in the outer end of each cylinder and having extending piston rods, a bumper member supported on said rods, and each of said cylinders having additional pistons slidably mounted therein at spaced positions and resilient members between all of said pistons and varying in stiffness from each other, each of said cylinders having a plurality of side doors which may be opened to give access to said pistons and resilient members.

2. A cushioned bumper, comprising a plurality of parallel cylinders for attachment longitudinally on the chassis of a vehicle, a piston slidably mounted in the outer end of each cylinder and having extending piston rods, a bumper member supported on said rods, and each of said cylinders having additional pistons slidably mounted therein at spaced positions and resilient members between all of said pistons and varying in stiffness from each other, each of said cylinders having a plurality of side doors which may be opened to give access to said pistons and resilient members, said resilient members comprising springs.

3. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances.

4. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, each of said pistons being provided with a rubber periphery for silencing the sliding action thereof when the pistons move towards each other within said cylinders.

5. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said resilient members comprising springs of various stiffness operating between the adjacent faces of said pistons.

6. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said means comprising a bushing rotatively supported within an enlarged opening formed in each of said additional pistons and having a threaded opening through which a threaded portion of said rod extends, gear teeth formed on the periphery of said bushing, and a worm gear meshing with said teeth, a shaft for rotatively supporting said worm gear, and a means for permitting said shaft to be rotated to similarly rotate said worm gear and said bushing.

7. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said means comprising a bushing rotatively supported within an enlarged opening formed in each of said additional pistons and having a threaded opening through which a threaded portion of said rod extends, gear teeth formed on the periphery of said bushing, and a worm gear meshing with said teeth, a shaft for rotatively supporting said worm gear, and a means for permitting said shaft to be rotated to similarly rotate said worm gear and said bushing, said means comprising a groove formed on the extended end of said shaft and into which a screw driver is adapted to be engaged for rotating the same.

8. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said means comprising a bushing rotatively supported within an enlarged opening formed in each of said additional pistons and having a threaded opening through which a threaded portion of said rod extends, gear teeth formed on the periphery of said bushing, and a worm gear meshing with said teeth, a shaft for rotatively supporting said worm gear, and a means for permitting said shaft to be rotated to similarly rotate said worm gear and said bushing, said means comprising a groove formed on the extended end of said shaft and into which a screw driver is adapted to be engaged for rotating the same, each of said cylinders having a section of its side wall separated and hingedly supported, permitting the same to be opened to permit a screw driver to be engaged into said groove.

9. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said means comprising a bushing rotatively supported within an enlarged opening formed in each of said additional pistons and having a threaded opening through which a threaded portion of said rod extends, gear teeth formed on the periphery of said bushing, and a worm gear meshing with said teeth, a shaft for rotatively supporting said worm gear, and a means for permitting said shaft to be rotated to similarly rotate said worm gear and said bushing, and a means for holding said rods against rotating while they are being adjusted on said pistons.

10. A cushioned bumper, comprising a plurality of parallel cylinders for attachment longitudinally on the chassis of a vehicle, a piston slidably mounted in the outer end of each cylinder and having extending piston rods, a bumper member supported in said rods, and each of said cylinders having additional pistons slidably mounted therein at spaced positions, resilient members between all of said pistons and varying in stiffness from each other, and rods mounted on said additional pistons and extending towards the outer end of the cylinder for limiting the relative distances to which said pistons may move together and means for adjusting the rods forwards or rearwards for varying said relative distances, said means comprising a bushing rotatively supported within an enlarged opening formed in each of said additional pistons and having a threaded opening through which a threaded portion of said rod extends, gear teeth formed on the periphery of said bushing, and a worm gear meshing with said teeth, a shaft for rotatively supporting said worm gear, and a means for permitting said shaft to be rotated to similarly rotate said worm gear and said bushing, and a means for holding said rods against rotating while they are being adjusted on said pistons, said means comprising a bracket supported upon each of said pistons and having a squared opening, each of said rods having a square portion extending through said square opening.

JOHN GIBBONS.